(12) United States Patent
Elder et al.

(10) Patent No.: US 9,681,700 B2
(45) Date of Patent: Jun. 20, 2017

(54) ARTICLE OF FOOTWEAR WITH BLADDER AND METHOD OF MANUFACTURING THE SAME

(71) Applicant: NIKE, Inc., Beaverton, OR (US)

(72) Inventors: Zachary M. Elder, Portland, OR (US); Taryn M. Hensley, Portland, OR (US); Dervin A. James, Hillsboro, OR (US); Levi J. Patton, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 59 days.

(21) Appl. No.: 14/499,650

(22) Filed: Sep. 29, 2014

(65) Prior Publication Data
US 2015/0040426 A1 Feb. 12, 2015

Related U.S. Application Data

(62) Division of application No. 13/455,976, filed on Apr. 25, 2012, now Pat. No. 9,420,847.

(51) Int. Cl.
*A43B 13/20* (2006.01)
*A43B 3/10* (2006.01)
(Continued)

(52) U.S. Cl.
CPC .............. *A43B 13/20* (2013.01); *A43B 3/108* (2013.01); *A43B 3/122* (2013.01); *A43B 3/124* (2013.01);
(Continued)

(58) Field of Classification Search
CPC .. A43B 7/06; A43B 7/081; A43B 7/08; A43B 7/14; A43B 7/28; A43B 13/20;
(Continued)

(56) References Cited

U.S. PATENT DOCUMENTS 2,863,230 A * 12/1958 Cortina .................. A43B 13/20
36/29
3,608,215 A 9/1971 Tatsuo
(Continued)

FOREIGN PATENT DOCUMENTS

CN 2867950 Y 2/2007
CN 101842220 A 9/2010
(Continued)

OTHER PUBLICATIONS

International Preliminary Examination Report and Written Opinion for Application No. PCT/US2013/038015, mailed on Oct. 28, 2014.
(Continued)

*Primary Examiner* — Khoa Huynh
*Assistant Examiner* — Megan Brandon
(74) *Attorney, Agent, or Firm* — Honigman Miller Schwartz and Cohn LLP; Matthew H. Szalach; Jonathan P. O'Brien (57) ABSTRACT

A method of manufacturing an article of footwear having an upper, a footbed, an outsole, and a bladder that is disposed between the footbed and the outsole includes providing a plurality of layers. The layers include a top, outsole, first bladder, and second bladder layer. Also, the method includes molding the layers together substantially simultaneously to form the upper, the footbed, the outsole, and the bladder.

17 Claims, 5 Drawing Sheets

(51) Int. Cl.
- *A43B 3/12* (2006.01)
- *A43B 13/18* (2006.01)
- *B29D 35/04* (2010.01)
- *B29D 35/12* (2010.01)
- *B29D 35/14* (2010.01)

(52) U.S. Cl.
CPC ............ *A43B 3/128* (2013.01); *A43B 13/189* (2013.01); *B29D 35/04* (2013.01); *B29D 35/126* (2013.01); *B29D 35/142* (2013.01)

(58) Field of Classification Search
CPC ..... A43B 13/203; A43B 13/206; A43B 17/03; A43B 17/026; A43B 21/28; A43B 21/26; A43B 21/265; A43B 5/0405; A43B 3/12
USPC .......................................... 36/3 R, 3 A, 3 B
See application file for complete search history.

(56) References Cited

U.S. PATENT DOCUMENTS

| | | | |
|---|---|---|---|
| 4,829,682 A | 5/1989 | Gasbarro | |
| 4,906,502 A | 3/1990 | Rudy | |
| 5,025,575 A * | 6/1991 | Lakic | A41D 19/001 36/29 |
| 5,080,351 A | 1/1992 | Rockwell | |
| 5,083,361 A * | 1/1992 | Rudy | A43B 13/189 156/145 |
| 5,353,459 A | 10/1994 | Potter et al. | |
| 5,543,194 A | 8/1996 | Rudy | |
| 5,806,208 A * | 9/1998 | French | A43B 7/02 36/28 |
| 5,993,585 A | 11/1999 | Goodwin et al. | |
| 6,006,447 A * | 12/1999 | Neal | A43B 17/08 36/3 B |
| 6,014,823 A * | 1/2000 | Lakic | A41D 19/01523 36/11.5 |
| 6,557,274 B2 * | 5/2003 | Litchfield | A43B 1/0072 36/29 |
| 7,409,779 B2 | 8/2008 | Dojan et al. | |
| 7,478,488 B1 * | 1/2009 | Davis | A43B 7/081 36/29 |
| 7,546,698 B2 | 6/2009 | Meschter | |
| 7,574,818 B2 | 8/2009 | Meschter | |
| 2001/0032399 A1 * | 10/2001 | Litchfield | A43B 1/0072 36/88 |
| 2002/0170203 A1 | 11/2002 | Sanner | |
| 2003/0019128 A1 * | 1/2003 | Litchfield | A43B 13/203 36/29 |
| 2004/0003515 A1 * | 1/2004 | Marvin | A43B 13/20 36/45 |
| 2004/0045192 A1 | 3/2004 | Lin | |
| 2004/0163280 A1 * | 8/2004 | Morris | A43B 7/06 36/28 |
| 2004/0211084 A1 * | 10/2004 | Marvin | A43B 13/20 36/3 A |
| 2004/0244223 A1 | 12/2004 | Watkins | |
| 2005/0028404 A1 * | 2/2005 | Marvin | A43B 1/0072 36/45 |
| 2005/0039346 A1 | 2/2005 | Thomas et al. | |
| 2005/0198858 A1 * | 9/2005 | Hsu | A43B 7/081 36/3 A |
| 2006/0130369 A1 * | 6/2006 | Christensen | A43B 13/20 36/93 |
| 2006/0162186 A1 * | 7/2006 | Marvin | A43B 13/20 36/45 |
| 2006/0272179 A1 | 12/2006 | Passke et al. | |
| 2006/0277787 A1 | 12/2006 | Vattes et al. | |
| 2007/0084083 A1 * | 4/2007 | Hazenberg | A43B 1/0018 36/29 |
| 2007/0271822 A1 * | 11/2007 | Meschter | A43B 7/14 36/45 |
| 2007/0271823 A1 * | 11/2007 | Meschter | A43B 9/02 36/45 |
| 2008/0016715 A1 * | 1/2008 | Vickroy | A43B 7/141 36/2.6 |
| 2008/0019119 A1 | 1/2008 | Marston | |
| 2008/0196271 A1 | 8/2008 | Wang | |
| 2008/0229623 A1 * | 9/2008 | Ferretti | A43B 7/082 36/3 B |
| 2008/0295361 A1 | 12/2008 | Johnson et al. | |
| 2008/0313930 A1 | 12/2008 | Lee | |
| 2009/0151196 A1 * | 6/2009 | Schindler | A43B 13/20 36/29 |
| 2009/0178299 A1 | 7/2009 | Lafortune | |
| 2009/0178300 A1 | 7/2009 | Parker | |
| 2009/0288313 A1 * | 11/2009 | Rapaport | A43B 1/04 36/29 |
| 2010/0031533 A1 | 2/2010 | Keenan et al. | |
| 2010/0199406 A1 | 8/2010 | Dua et al. | |
| 2010/0199520 A1 | 8/2010 | Dua et al. | |
| 2010/0199521 A1 * | 8/2010 | Katz | A43B 1/0027 36/100 |
| 2011/0067264 A1 * | 3/2011 | Doyle | A43B 13/203 36/29 |
| 2011/0192053 A1 * | 8/2011 | Beers | A43B 13/20 36/103 |
| 2011/0271552 A1 | 11/2011 | Peyton | |
| 2011/0277346 A1 | 11/2011 | Peyton et al. | |
| 2012/0042537 A1 * | 2/2012 | Dimatteo | A43B 3/128 36/11.5 |
| 2012/0167270 A1 * | 7/2012 | Strong | A41D 27/08 2/69 |
| 2012/0198729 A1 | 8/2012 | Graziani et al. | |
| 2012/0260524 A1 * | 10/2012 | Izquieta Anaut | A43B 13/187 36/28 |
| 2013/0160329 A1 | 6/2013 | Peyton et al. | |
| 2013/0192087 A1 * | 8/2013 | Litchfield | A43B 13/20 36/29 |
| 2013/0227857 A1 | 9/2013 | Schindler et al. | |
| 2014/0173938 A1 * | 6/2014 | Beye | A43B 9/12 36/102 |

FOREIGN PATENT DOCUMENTS

| | | |
|---|---|---|
| KR | 20090018493 A | 2/2009 |
| NL | 7003069 A | 9/1970 |

OTHER PUBLICATIONS

International Search Report for Application No. PCT/US2013/038015, mailed on Feb. 13, 2014.
USPTO, Non-Final Office Action for U.S. Appl. No. 13/455,976, mailed Jun. 9, 2015.
USPTO, Final Office Action for U.S. Appl. No. 13/455,976, mailed Dec. 17, 2014.
USPTO, Non-Final Office Action for U.S. Appl. No. 13/455,976, mailed Sep. 17, 2014.
State Intellectual Property Office (S.I.P.O.), CN Office Action for 201380021192.8, mailed Jul. 5, 2016.

* cited by examiner

ARTICLE OF FOOTWEAR WITH BLADDER AND METHOD OF MANUFACTURING THE SAME

CROSS-REFERENCE TO RELATED APPLICATION

This application is a divisional of co-pending application Ser. No. 13/455,976, filed Apr. 25, 2012, the disclosure of which is hereby incorporated by reference.

FIELD

The present disclosure relates to footwear and, more particularly, to an article of footwear with a bladder and a method of manufacturing the same.

BACKGROUND

This section provides background information related to the present disclosure which is not necessarily prior art.

Articles of footwear can include an upper and a sole assembly. The upper can include layers or sections of material that wrap about a portion of the wearer's foot. The upper can also include laces, straps, or the like for securing the footwear to the wearer's foot. The sole assembly can be lasted to the upper and can be disposed underneath the wearer's foot. The sole assembly can include a footbed, a midsole, and an outsole. The footbed can be a thin layer of material with a surface that is disposed directly underneath the wearer's foot. The outsole can be a unitary piece of relatively high-friction material that provides traction for the footwear. Also, the midsole can include foam that is disposed between the footbed and the outsole for providing cushioned support for the wearer.

In some cases, the midsole can additionally include a bladder that contains a fluid, such as a gas or gel. The weight of the wearer and other loading on the bladder can cause the fluid to displace within the bladder. As such, the bladder can resiliently deform and conform to the wearer's foot in order to provide better support and comfort than some midsoles made entirely out of foam. Also, the bladder can dampen or attenuate shock loads or other loads during jumping, running, and other activities to provide better cushioning.

Although conventional footwear with bladders have been adequate for their intended purposes, they do suffer from certain disadvantages. For instance, manufacturing of the footwear can be significantly expensive and complicated. For instance, the bladder itself increases the part count of the footwear. Also, the bladder is typically manufactured separately from the rest of the sole assembly, and then the bladder is assembled into the sole assembly. As such, the bladder can increase part costs and manufacturing costs.

SUMMARY

This section provides a general summary of the disclosure, and is not a comprehensive disclosure of its full scope or all of its features.

A method of manufacturing an article of footwear having an upper, a footbed, an outsole, and a bladder that is disposed between the footbed and the outsole is disclosed. The method includes providing a plurality of layers that are separate from each other in a molding apparatus. The plurality of layers include a top layer, an outsole layer, a first bladder layer, and a second bladder layer. The first and second bladder layers are provided between the top layer and the outsole layer. Also, the method includes molding the plurality of layers together substantially simultaneously to form the upper, the footbed, the outsole, and the bladder. The top layer is molded to a first outer surface of the first bladder layer. The outsole layer is molded to a second outer surface of the second bladder layer. A first inner surface of the first bladder layer is molded and sealed to a second inner surface of the second bladder layer to define a chamber between the first inner surface and the second inner surface. The chamber is operable to contain a fluid. The top layer at least partially defines the upper and the footbed. The outsole layer at least partially defines the outsole, and the first and second bladder layers cooperate to define the bladder.

An article of footwear is also disclosed that includes a top layer, an outsole layer, a first bladder layer that includes a first inner surface and a first outer surface, and a second bladder layer that includes a second inner surface and a second outer surface. The top layer, the outsole layer, the first bladder layer, and the second bladder layer are layered over each other. The top layer is molded to the first outer surface of the first bladder layer, and the outsole layer is molded to the second outer surface of the second bladder layer. The first inner surface of the first bladder layer is molded and sealed to the second inner surface of the second bladder layer to define a chamber between the first inner surface and the second inner surface. The chamber is operable to contain a fluid. The top layer at least partially defines an upper and a footbed of the article of footwear. The outsole layer at least partially defines an outsole of the article of footwear.

Still further, a method of manufacturing a sandal having a strap, a footbed, an outsole, a bladder that is disposed between the footbed and the outsole, and a light-transmissive member that is attached to the strap is disclosed. The method includes providing a plurality of layers that are separate from each other in a molding apparatus. The plurality of layers include a top layer, an outsole layer, a first bladder layer, and a second bladder layer. The first and second bladder layers are provided between the top layer and the outsole layer. Moreover, the method includes molding the plurality of layers together substantially simultaneously to form the upper, the footbed, the outsole, and the bladder. The top layer is molded to a first outer surface of the first bladder layer. The outsole layer is molded to a second outer surface of the second bladder layer. A first inner surface of the first bladder layer is molded and sealed to a second inner surface of the second bladder layer to define a first chamber and a second chamber between the first inner surface and the second inner surface. The first chamber and the second chamber are in fluid communication and each is operable to contain a fluid. The top layer defines the strap and the footbed, the outsole layer defines the outsole, and the first and second bladder layers cooperate to define the bladder and the light-transmissive member. The top layer includes at least one of an insignia and a symbol that is visible through the light-transmissive member. The outsole layer at least partially defines a fastener member that removably and selectively fastens to the strap.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Referring initially to FIGS. 1-4, an article of footwear 10 is illustrated. The article of footwear 10 can be of any suitable type, such as a shoe, a boot, or any other type. As shown in the embodiments illustrated, the footwear 10 can be an open-toed type, such as a sandal 12 with various features that will be discussed in detail below. Although a sandal 12 for a left foot is illustrated, it will be appreciated that the sandal 12 can be configured for a right foot and can include similar features.

Figure 1:
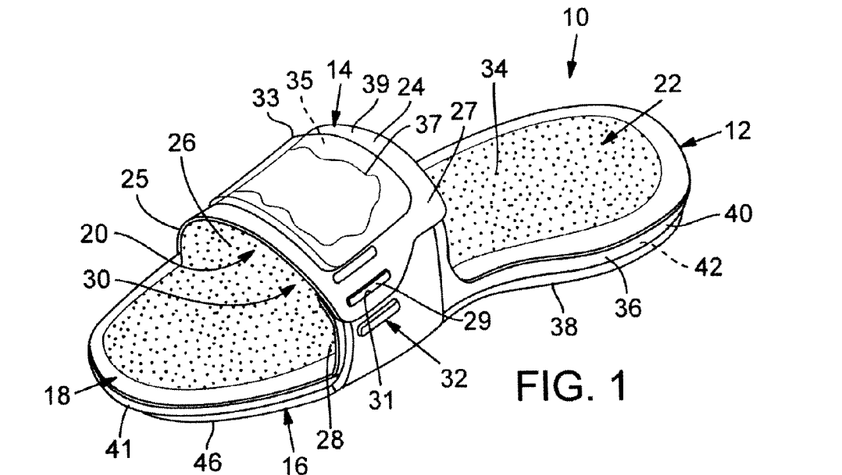
FIG. 1 is an isometric view of an article of footwear according to teachings of the present disclosure.

The sandal 12 can generally include an upper 14 and a sole assembly 16. As shown in FIG. 1, the sole assembly 16 can define a forefoot region 18 for supporting a forefoot (i.e., toes, etc.) of the wearer's foot. The assembly 16 can also include a midfoot region 20 for supporting a midfoot (i.e., carpal bones and surrounding tissue, etc.) of the wearer's foot. Finally, the assembly 16 can include a rearfoot region 22 for supporting a rearfoot (i.e., heel, etc.) of the wearer.

Figure 4:
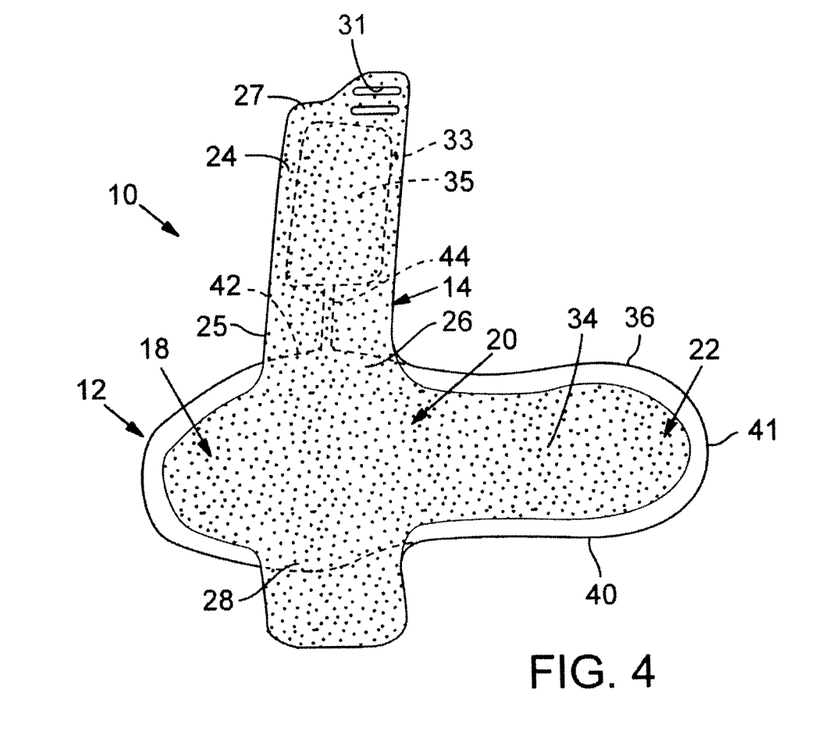
FIG. 4 is a plan view of the article of footwear of FIG. 1.
Figure 5:
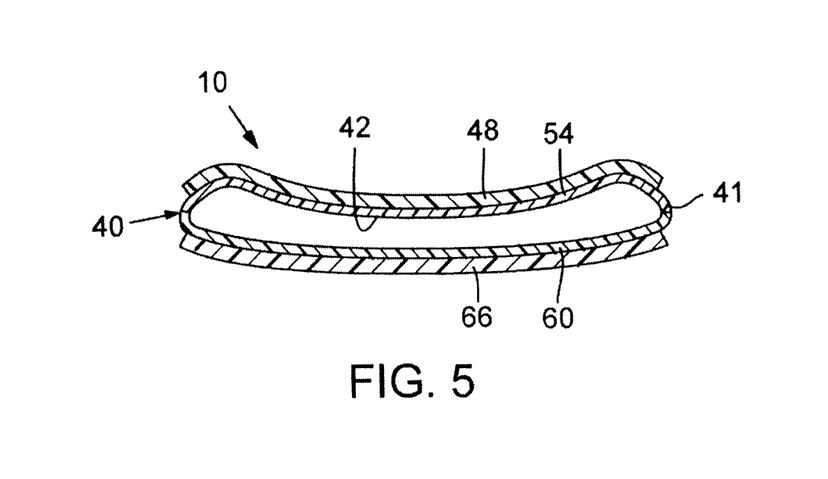
FIG. 5 is a section view taken along line 5-5 of FIG. 2.

The upper 14 can include a strap 24. As shown in FIG. 4, the strap 24 can be elongate and can include a first end 25 and a second end 27. The first end 25 can be fixedly attached to a first side 26 (i.e., medial side) of the sandal 12. The strap 24 can extend freely from the first side 26. Also, as shown in FIG. 1, the strap 24 can be selectively bent and curved so as to extend toward a second side 28 (i.e., a lateral side) of the sandal 12. The second end 27 can removably connect to the second side 28 of the sandal 12. As such, an opening 30 (FIG. 1) can be defined between the strap 24 and the sole assembly 16. The wearer's foot (not shown) can be received in the opening 30 to secure the sandal 12 to the wearer's foot.

Figures 2, 3:
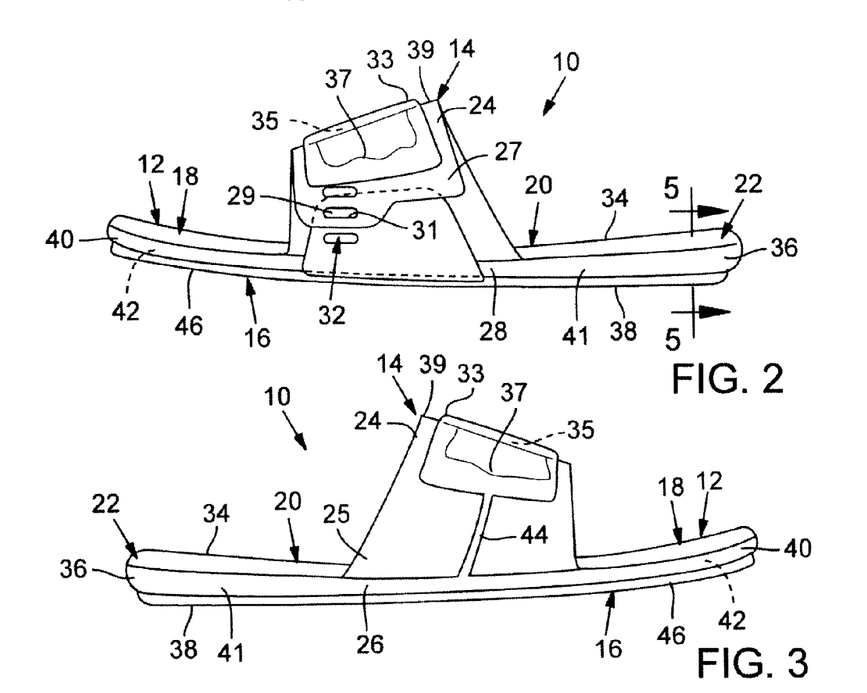
FIG. 2 is a first side view of the article of footwear of FIG. 1.
FIG. 3 is a second side view of the article of footwear of FIG. 1.

As stated, the second end 27 can removably connect to the second side 28 of the sandal 12. More specifically, as shown in FIG. 1, the sandal 12 can include a fastener member 32 for securing the second end 27 and the second side 28 together. For instance, the fastener member 32 can include a projection 29 on the second side 28, and the fastener member 32 can include an opening 31 formed in the second end 27 of the strap 24. The projection 29 can be removably and securely received within the opening 31 via an interference fit, a frictional fit, etc. Furthermore, as shown in FIGS. 1 and 2, the sandal 12 can include a plurality of projections 29 that are arranged generally in a row. The wearer can selectively choose which of the projections 29 to fit within the opening 31 to thereby change the size of the opening 30 and the tightness of the strap 24 around the foot. It will be appreciated that the fastener member 32 could vary from the embodiments shown and include hook-and-loop tape (e.g., VELCRO™) or other fasteners. Furthermore, the second end 27 of the strap 24 can include the projection 29 while the second side 28 can include the opening 31 without departing from the scope of the present disclosure.

The sole assembly 16 can also include a footbed 34, a midsole 36, and an outsole 38. The footbed 34 can be a layer of material and/or a surface that extends continuously between the forefoot, midfoot, and rearfoot regions 18, 20, 22 and can be disposed directly beneath the wearer's foot. The outsole 38 can be a layer of high-friction material that extends continuously between the forefoot, midfoot, and rearfoot regions 18, 20, 22 and can be operable to be disposed directly on the ground, pavement, floor, etc. The outsole 38 can also include treading, grooves, high surface roughness, or other features for enhancing traction. The midsole 36 can be one or more layers of material that is operable to be disposed between the footbed 34 and the outsole 38. The midsole 36 can be resilient and compressible to provide cushioned support. The midsole 36 can be fixedly attached to both the footbed 34 and the outsole 38.

The footbed 34, midsole 36, and outsole 38 can be made out of any suitable material. In some embodiments, the footbed 34 is made out of a material disclosed in U.S. Patent Publication No. 2010/0199406, filed Feb. 6, 2009 and published Aug. 12, 2010 and/or U.S. Patent Publication No. 2010/0199520, filed Oct. 15, 2009 and published Aug. 12, 2010, the entire disclosures of which are incorporated by reference. Also, in some embodiments, the midsole 36 includes one or more layers of a monopolymeric material, thermoplastic polyurethane (TPU), etc. The outsole 38 can be made of a polymeric material that has a substantially high coefficient of friction.

Moreover, the sandal 12 can include a light-transmissive member 33. The light-transmissive member 33 can be layered on a top, exterior surface 39 of the strap 24 in some embodiments. The light-transmissive member 33 can be colorless and clear, or the light-transmissive member 33 can be colored. Also, in some embodiments, the light-transmissive member 33 can define a first chamber 35 that is operable to contain a fluid (e.g., air, gel, etc.). Moreover, an insignia, a design, a picture, a symbol, or some other illustrated object 37 can be included on the top, exterior surface 39 of the strap 24, and the object 37 can be visible through the light-transmissive member 33. Thus, the light-transmissive member 33 and the object 37 can enhance the aesthetics of the sandal 12.

As shown in FIG. 4, the midsole 36 can also include a bladder 40 with a second chamber 42 defined therein. The second chamber 42 can be operable to contain a fluid (e.g., air, gel, foam, etc.). The second chamber 42 can be divided into one or more sub-chambers in some embodiments. In some embodiments, the second chamber 42 can be fluidly connected to the first chamber 35. For instance, as shown in FIGS. 3 and 4, a relatively small-diameter passage 44 can extend between and fluidly connect the first and second chambers 35, 42. In additional embodiments, the chambers 35, 42 are fluidly disconnected such that the chambers 35, 42 can be pressurized independently and to different pressures. Furthermore, in some embodiments, a periphery 41 of the bladder 40 can be exposed from the footbed 34 and the outsole 38. In some embodiments, the bladder 40 can be clear and colorless, or the bladder 40 can be colored. Thus, the bladder 40 can provide cushioned support and comfort to the wearer's foot.

Figure 6:
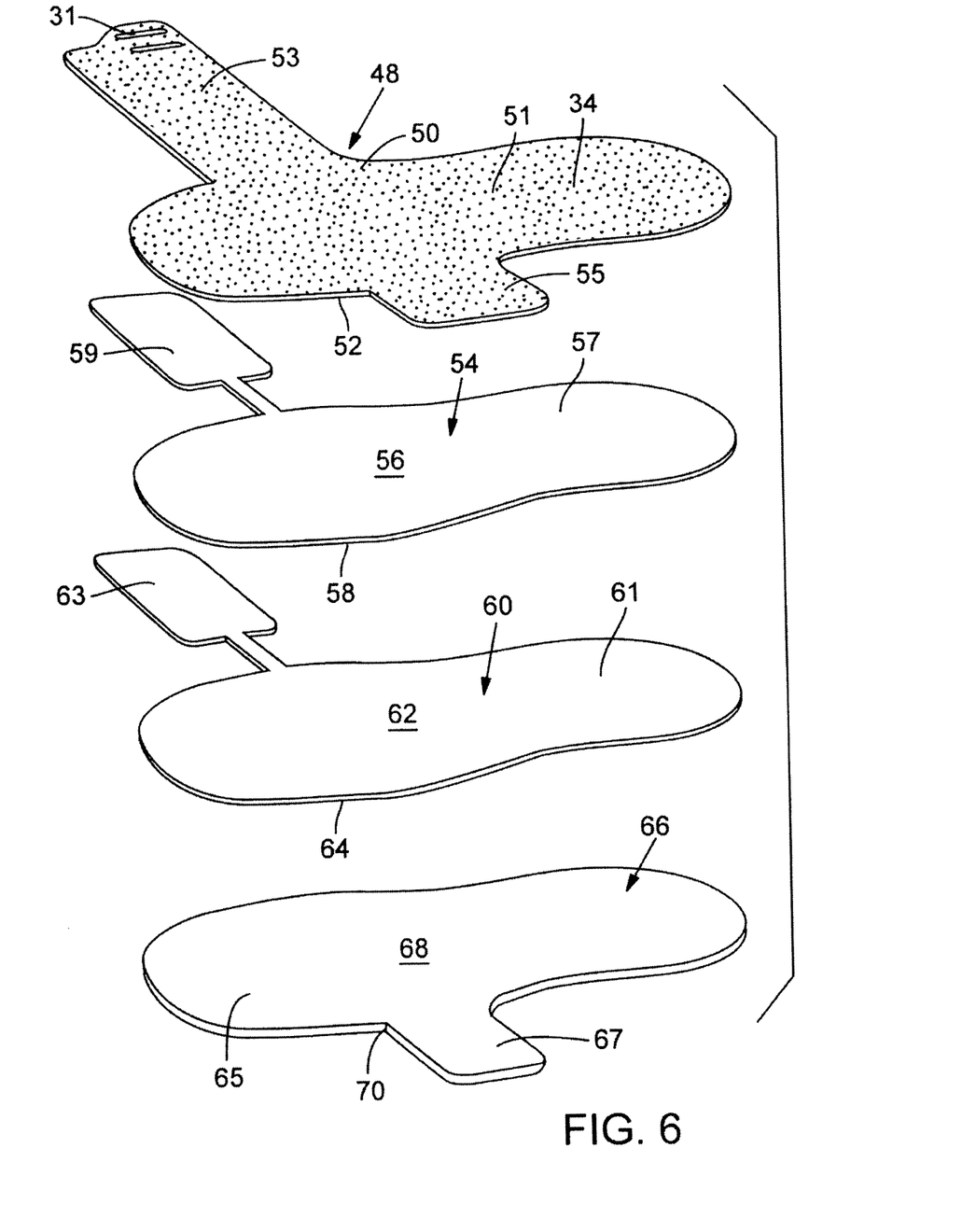
FIG. 6 is an exploded view of the article of footwear of FIG. 1.
Figure 7A:
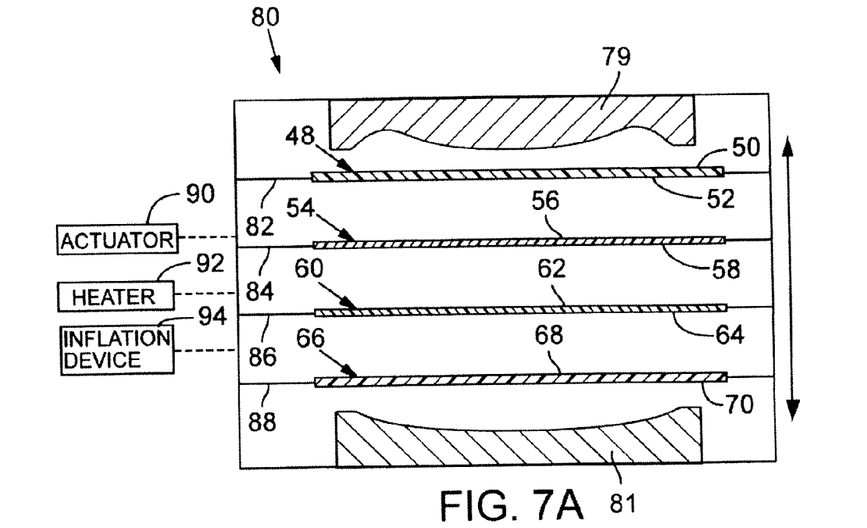
FIG. 7A is a schematic section view of a thermoforming apparatus for forming the article of footwear of FIG. 1, wherein layers of the article of footwear are shown prior to be thermoformed and joined together.
Figure 7B:
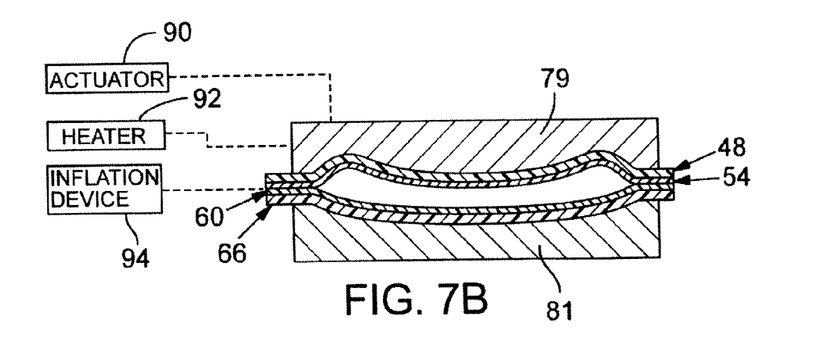
FIG. 7B is a schematic section view of the article of footwear shown after the layers of the footwear have been thermoformed and joined together.

Referring now to FIGS. 6, 7A, and 7B, additional features of the footwear 10 and its method of manufacture will now be discussed. As will be discussed, the footwear 10 can be manufactured from a plurality of separate layers 48, 54, 60, 66 of material that are molded and joined together to define the upper 14 and the sole assembly 16. The layers 48, 54, 60, 66 can be molded and joined substantially simultaneously in a thermoforming molding process. Thus, the footwear 10 can be manufactured in a very efficient manner.

As shown in FIG. 6, the footwear 10 can be constructed from a top layer 48 with an outer surface 50 and an inner surface 52. The top layer 48 can be continuous layer of material with a main body 51, a strap member 53, and a fastener support member 55. The strap member 53 and fastener support member 55 can extend from opposite sides of the main body 51. The top layer 48 can be substantially flat, or the top layer 48 can be contoured. The top layer 48 can have any suitable thickness. The top layer 48 can be made out of any suitable material, such as a material disclosed in U.S. Patent Publication No. 2010/0199406, filed Feb. 6, 2009 and published Aug. 12, 2010 and/or U.S. Patent Publication No. 2010/0199520, filed Oct. 15, 2009 and published Aug. 12, 2010, the entire disclosures of which are incorporated by reference. Also, the top layer 48 can be made out of a material that provides friction or grip against the wearer's foot, that provides added comfort, that incorporates a gel or other substance, and/or that acts as a heat sink to remove heat from the wearer's foot. As will be discussed, the top layer 48 can be configured to define the upper 14 and the footbed 34 of the sandal 12.

The footwear 10 can also be constructed from a first bladder layer 54 having an outer surface 56 and an inner surface 58. The first bladder layer 54 can be a continuous layer of material with a main body 57 and a first extension 59 that extends from the main body 57. As will be discussed, the main body 57 can be configured to partially define the bladder 40 of the midsole 36, and the extension 59 can be configured to partially define the light transmissive member 33. The first bladder layer 54 can be flat and can have any suitable thickness. The first bladder layer 54 can also be made from any suitable material, such as thermoplastic polyurethane (TPU), etc.

Moreover, the footwear 10 can be constructed from a second bladder layer 60 having an outer surface 64 and an inner surface 62. The second bladder layer 60 can be a continuous layer of material with a main body 61 and a second extension 63 that extends from the main body 57. As will be discussed, the main body 61 can be configured to partially define the bladder 40 of the midsole 36, and the extension 63 can be configured to partially define the light transmissive member 33. The second bladder layer 60 can be flat and can have any suitable thickness. Also, the second bladder layer 60 can be made from any suitable material, such as thermoplastic polyurethane (TPU), etc.

Still further, the footwear 10 can be constructed from an outsole layer 66. The outsole layer 66 can be a flat, continuous sheet of high-friction polymeric material. The outsole layer 66 can include an outer surface 70 and an inner surface 68. Furthermore, the outsole layer 66 can include a main body 65 and a fastener support member 67 that extends from the main body 65.

As shown in FIG. 7A, the top layer 48, the first bladder layer 54, the second bladder layer 60, and the outsole layer 66 can be molded and/or thermoformed together in a molding apparatus 80 to form the sandal 12. The molding apparatus 80 can include a first mold 79 and a second mold 81. The molding apparatus 80 can also include a first handling member 82 that supports the top layer 48, a second handling member 84 that supports the first bladder layer 54, a third handling member 86 that supports the second bladder layer 60, and a fourth handling member 88 that supports the outsole layer 66. In some embodiments, the handling members 82, 84, 86, 88 can be frames that retain the periphery of the respective layer 48, 54, 60, 66 (e.g., via suction).

Also, the molding apparatus 80 can include an actuator 90 that is operable to move the molds 79, 81 and/or the handling members 82, 84, 86, 88 relative to each other. The actuator 90 can be a pneumatic actuator, an electric motor, a hydraulic actuator, or any other type.

Furthermore, the molding apparatus 80 can include a heat source 92. The heat source 92 can heat the molds 79, 81 or otherwise heat the molding apparatus 80 to change the shape of the layers 48, 54, 60, 66 and join the layers 48, 54, 60, 66 together to form the sandal 12.

Additionally, the molding apparatus 80 can include an inflation device 94, such as a pump, etc. As will be discussed, the inflation device 94 can inflate one or both of the chambers 35, 42 of the sandal 12. In some embodiments, the inflation device 94 can include a tube or other similar feature (not shown), which can extend between the first and second bladder layers 54, 60 and supply a fluid (e.g., air, etc.) thereto to inflate the chambers 35, 42.

As shown in FIG. 7A, the layers 48, 54, 60, 66 can be loaded (manually or automatically) within the molding apparatus 80. Then, the actuator 90 can move the molds 79, 81 and the handling members 82, 84, 86, 88 together to sandwich the layers 48, 54, 60, 66 together as shown in FIG. 7B. Once in this position, the molds 79, 81 can mold the layers 48, 54, 60, 60, heat from the heat source 92 can join the layers 48, 54, 60, 66 together, and the chambers 35, 42 can be inflated substantially simultaneously. More specifically, the outer surface 50 of the top layer 48 can abut and conform to the mold surface of the first mold 79, and the outer surface 56 of the first bladder layer 54 can join to the inner surface 52 of the top layer 48. Likewise, the outer surface 70 of the outsole layer 66 can abut and conform to the mold surface of the second mold 81, and the outer surface 64 of the second bladder layer 60 can join to the inner surface 68 of the outsole layer 66. Also, the peripheries of the first and second bladder layers 54, 60 can seal together to define the first and second chambers 35, 42. The inflation device 94 can also provide positive fluid pressure to inflate the first and second chambers 35, 42 while within the molding apparatus 80. In additional embodiments, the first and second chambers 35, 42 are subsequently inflated (e.g., outside the molding apparatus 80 after the layers 48, 54, 60, 66 have been joined).

Additionally, in some embodiments, the first and second chambers 35, 42 are inflated to different pressures. For instance, the chambers 35, 42 can be initially inflated to the same pressure, then the chambers 35, 42 can be sealed off from each other. Next, the pressure for at least one of the chambers 35, 42 can be adjusted such that the chambers 35, 42 are at different pressures. In some embodiments, the chambers 35, 42 can be formed and inflated according to the teachings of U.S. Pat. No. 5,353,459, filed Sep. 1, 1993 and issued Oct. 11, 1994, which is incorporated by reference in its entirety.

It will be appreciated that once the layers 48, 54, 60, 66 are joined and thermoformed, the main body 57 of the first bladder layer 54 (FIG. 6) and the main body 61 of the second bladder layer 60 can cooperate to define the bladder 40 of the sandal 12. Also, the first and second extensions 59, 63 can cooperate to define the light-transmissive member 33 and the chamber 35 therein. Still further, the bladder 40 can join to the main body 51 of the top layer 48, and the bladder 40 can join to the main body 65 of the outsole layer 66. Additionally, the main body 51 of the top layer 48 can define the footbed 34 of the sandal 12, the strap member 53 can partially define the strap 24 of the sandal 12, and the fastener support member 55 can partially define the second side 28 of the sandal 12. Additionally, the main body 65 of the outsole layer 66 can define the outsole 38 of the sandal 12, and the fastener support member 67 can define the projections 29 and can join directly to the fastener support member 55.

Once formed, the sandal 12 can be removed from the molding apparatus 80, and excess material can be trimmed away. Also, the first and second chambers 35, 42 can be inflated outside the molding apparatus 80 if necessary.

Accordingly, the sandal 12 can be formed in a very efficient manner. For instance, the bladder 40 can be inflated and incorporated within the sandal 12 in substantially a single step to thereby increase manufacturing efficiency. Also, the layers 48, 54, 60, 66 can be joined together in a substantially simultaneous manner.

Figure 8:
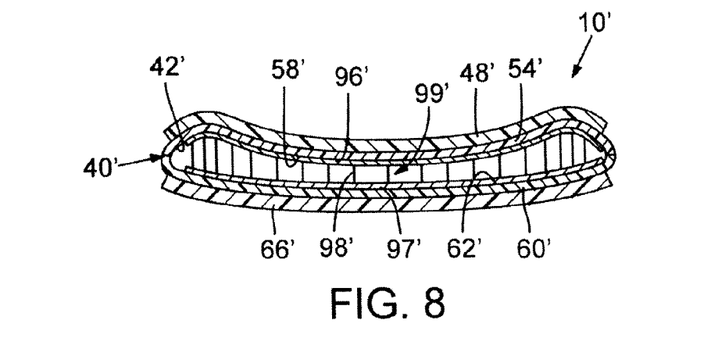
FIG. 8 is a section view of the article of footwear according to additional exemplary embodiments of the present disclosure.

In additional embodiments illustrated in FIG. 8, an insert member 99' can be provided within the bladder 40' (i.e., between the first and second bladder layers 54', 60'). The insert member 99' can be made out of any suitable material. For instance, in some embodiments, the insert member 99' can be constructed according to the teachings of U.S. Pat. No. 4,906,502, filed Feb. 5, 1988 and issued Mar. 6, 1990, U.S. Pat. No. 5,083,361, filed Apr. 4, 1991 and issued Jan. 28, 1992, U.S. Pat. No. 5,543,194, filed Apr. 3, 1991 and issued Aug. 6, 1996, and/or U.S. Pat. No. 6,119,371, filed Jul. 8, 1999 and issued Sep. 19, 2000, the entirety of each being hereby incorporated by reference. Thus, the insert member 99' can include a first sheet 96' that is attached to the inner surface 58' of the first bladder layer 54', a second sheet 97' that is attached to the inner surface 62' of the second bladder layer 60', and a plurality of connecting members 98' that extend between and are attached to the first and second sheets 96', 97'. Thus, the connecting members 98' can be in tension to thereby maintain a predetermined shape of the bladder 40'. It will be appreciated, however, that the insert member 99' could be different. For instance, the insert member 99' can be foam or other resilient material in some embodiments.

Figure 9:
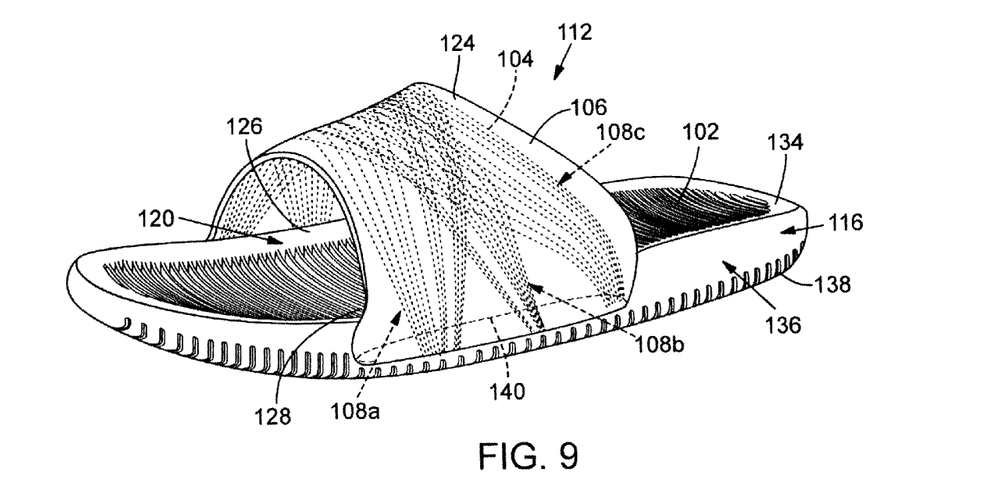
FIG. 9 is an isometric view of an article of footwear according to additional embodiments of the present disclosure.

Referring now to FIG. 9, additional embodiments of the sandal 112 are illustrated according to additional exemplary embodiments. Components that correspond to those of FIGS. 1-8 are indicated with corresponding reference numbers increased by 100.

As shown, the sandal 112 can include a strap 124 and a sole assembly 116. The sole assembly 116 can include a footbed 134, a midsole 136, and an outsole 138. The midsole 136 can include a bladder 140 (shown in phantom) that is arranged at the midfoot region 120 and that is embedded between the footbed 134 and the outsole 138.

In some embodiments, the footbed 134 can include a plurality of grooves 102. The grooves 102 can each extend transversely between the first and second sides 126, 128 of the sandal 112.

Also, the strap 124 can be made from a variety of materials. For instance, the strap 124 can be made from textiles, fabrics, foam, leather, and elastomeric materials that include multiple material layers. In the embodiments illustrated, the strap 124 is fixed at each end to the sole assembly 116; however, the strap 124 could be removably attached at one end to the sole assembly 116 in some embodiments as well.

In some embodiments, the strap 124 can include a plurality of thread members 104 that are included within a base material 106. The base material 106 can be a polymeric material of some type, and the thread members 104 can be fibers of relatively high-strength, nonextendable material. The thread members 104 can be arranged in a plurality of groups 108a, 108b, 108c that each extend longitudinally along the strap 124 between the first and second sides 126, 128. More specifically, the thread members 104 can curve arcuately along the strap 124. Also, the thread members 104 can be closely bundled at the sides 126, 168, and the midsections of the thread members 104 can be spaced further apart from each other such that the thread members 104 collectively fan out over the width of the strap 124. Additionally, some of the thread members 104 can overlap other thread members 104 of other groups 108a, 108b, 108c.

In some embodiments, the thread members 104 can increase the tensile strength of the strap 124 and inhibit elongation of the strap 124. The thread members 104 can individually have relatively high tensile strength; thus, the thread members 104 can collectively increase tensile strength of the strap 124. Also, the thread members 104 can help distribute forces through the strap 124 because the thread members 104 extend over the majority of the strap 124. Thus, the strap 124 is unlikely to fail, and the thread members 104 can increase comfort for the wearer because there is less likelihood of stress concentrations in the strap 124.

In some embodiments, each end of the thread members 104 can be bonded or otherwise joined directly to the bladder 140. The thread members 104 can be joined via adhesives, thermoplastic bonds, or otherwise. In additional embodiments, the thread members 104 can wrap around a bottom region (not shown) of the bladder 140 to extend annularly and continuously (i.e., uninterrupted) between the bladder 140 and the strap 124. As such, the thread members 104 can bias the bladder 140 upward toward the strap 124. In some embodiments, this biasing can place the bladder 140 in compression.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An article of footwear comprising:
   a top layer at least partially defining an upper and a
      footbed of the article of footwear and including a strap member extending from one of a medial side and a lateral side of the article of footwear;

an outsole layer at least partially defining a ground-contacting surface of the article of footwear;

a first bladder layer including a first inner surface, a first outer surface, and a first extension extending from the one of the medial side and the lateral side of the article of footwear; and a second bladder layer including a second inner surface, a second outer surface, and a second extension extending from the one of the medial side and the lateral side of the article of footwear, the top layer, the outsole layer, the first bladder layer, and the second bladder layer being layered over each other with the strap member aligned with the first extension and aligned with the second extension, the top layer being molded to the first outer surface of the first bladder layer, the outsole layer being molded to the second outer surface of the second bladder layer, the first inner surface of the first bladder layer being molded and sealed to the second inner surface of the second bladder layer to define a first chamber between the first inner surface and the second inner surface, the first chamber operable to contain a fluid, positioned between the top layer and the outsole layer, and having a periphery that is exposed and visible to a user.

2. The article of footwear of claim 1, wherein the top layer spans continuously between a forefoot region, a midfoot region, and a rearfoot region of the footbed.

3. The article of footwear of claim 1, wherein the outsole layer spans continuously between a forefoot region, a midfoot region, and a rearfoot region of the ground-contacting surface.

4. The article of footwear of claim 1, further comprising a fastener support member extending from the outsole layer, the fastener support member operable to be selectively attached to the strap member to define an opening between the strap member, the fastener support member, and the footbed and extending from the other of the medial side and the lateral side of the article of footwear.

5. The article of footwear of claim 1, further comprising an exposed light-transmissive member that is attached to the strap member, at least one of the first bladder layer and the second bladder layer defining the light-transmissive member.

6. The article of footwear of claim 5, wherein the first bladder layer and the second bladder layer cooperate to define the light-transmissive member, an interior of the light-transmissive member being in fluid communication with the first chamber.

7. The article of footwear of claim 1, wherein the first extension and the second extension cooperate to define a second chamber, the second chamber in fluid communication with the first chamber and operable to contain a fluid therein.

8. An article of footwear having a forefoot region, a midfoot region, and a rearfoot region, the article of footwear comprising:

an upper member spanning continuously between the forefoot region, the midfoot region, and the rearfoot region and including a strap member, the upper member at least partially defining an upper and a footbed of the article of footwear;

an outsole member spanning continuously between the forefoot region, the midfoot region, and the rearfoot region, the outsole member at least partially defining a ground-contacting surface of the article of footwear;

a first bladder member spanning continuously between the forefoot region, the midfoot region, and the rearfoot region, the first bladder member including a first inner surface, a first outer surface, and a first extension; and a second bladder member spanning continuously between the forefoot region, the midfoot region, and the rearfoot region, the second bladder member including a second inner surface, a second outer surface, and a second extension;

the upper member, the outsole member, the first bladder member, and the second bladder member being layered over each other with the strap member aligned with the first extension and aligned with the second extension;

the upper member being attached to the first bladder member;

the outsole member being attached to the second bladder member;

the first inner surface of the first bladder member being sealed to the second inner surface of the second bladder member to define a first chamber between the first inner surface and the second inner surface, the first chamber operable to contain a fluid, positioned between the upper member and the outsole member, and having a periphery that is exposed and visible to a user.

9. The article of footwear of claim 8, wherein the first extension and the second extension cooperate to define a second chamber operable to contain a fluid.

10. The article of footwear of claim 9, wherein the first chamber is in fluid communication with the second chamber.

11. The article of footwear of claim 8, wherein the outsole member includes a fastener support member operable to be selectively attached to the strap member to define an opening between the strap member, the fastener support member, and the footbed, the fastener support member extending from the article of footwear on an opposite side than the strap member.

12. The article of footwear of claim 8, further comprising an exposed light-transmissive member that is attached to the strap member, and wherein at least one of the first bladder member and the second bladder member defines the light-transmissive member.

13. The article of footwear of claim 8, further comprising a plurality of fibers that are substantially nonextendable and are attached to the strap member.

14. The article of footwear of claim 13, wherein the plurality of fibers are spaced apart from one another at a first distance proximate to one of a medial side and a lateral side of the article of footwear and are spaced apart from one another at a second distance in an area spaced apart from the one of the medial side and the lateral side of the article of footwear, the first distance being less than the second distance.

15. The article of footwear of claim 14, wherein the plurality of fibers overlap.

16. The article of footwear of claim 8, wherein the footbed and the strap member are formed from the same, unitary sheet of material.

17. The article of footwear of claim 8, wherein the upper member is layered and molded on the first bladder member; and wherein the outsole member is layered and molded on the second bladder member.

* * * * *